(12) United States Patent
More et al.

(10) Patent No.: US 12,153,932 B2
(45) Date of Patent: Nov. 26, 2024

(54) TECHNIQUES FOR ACCELERATION OF A PREFIX-SCAN OPERATION

(71) Applicant: Intel Corporation, Santa Clara, CA (US)

(72) Inventors: Ankit More, San Mateo, CA (US); Fabrizio Petrini, Menlo Park, CA (US); Robert Pawlowski, Beaverton, OR (US); Shruti Sharma, Hillsboro, OR (US); Sowmya Pitchaimoorthy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 17/129,555

(22) Filed: Dec. 21, 2020

(65) Prior Publication Data
US 2021/0149683 A1     May 20, 2021

(51) Int. Cl.
*G06F 9/4401*     (2018.01)
*G06F 13/40*     (2006.01)

(52) U.S. Cl.
CPC ........ *G06F 9/4411* (2013.01); *G06F 13/4022* (2013.01); *G06F 13/4027* (2013.01)

(58) Field of Classification Search
CPC .................................................... G06F 9/4411
See application file for complete search history.

(56) References Cited

U.S. PATENT DOCUMENTS

| | | | |
|---|---|---|---|
| 6,542,918 B1 * | 4/2003 | Vishkin | G06F 9/3838 712/E9.046 |
| 9,396,512 B2 * | 7/2016 | Karras | G06T 17/005 |
| 2019/0065621 A1 * | 2/2019 | Boles | G06F 16/9027 |
| 2019/0146961 A1 * | 5/2019 | Finis | G06F 16/2246 707/743 |

* cited by examiner

*Primary Examiner* — Henry Tsai
*Assistant Examiner* — Aurangzeb Hassan
(74) *Attorney, Agent, or Firm* — Essential Patents Group, LLP; Christopher K. Gagne

(57) ABSTRACT

Examples include techniques for an in-network acceleration of a parallel prefix-scan operation. Examples include configuring registers of a node included in a plurality of nodes on a same semiconductor package. The registers to be configured responsive to receiving an instruction that indicates a logical tree to map to a network topology that includes the node. The instruction associated with a prefix-scan operation to be executed by at least a portion of the plurality of nodes.

25 Claims, 12 Drawing Sheets

SYSTEM 100

INSTRUCTION TABLE 500

| Instruction | ASM Form Arguments | Description |
| --- | --- | --- |
| pscan.{add/mul} | r1, r2, r3, r4, SIZE | r1 = ID of collective tree;<br>r2 = base address of source data array;<br>r3 = base address of destination data array;<br>r4 = count of elements in array;<br>SIZE = {8bit/16bit/32bit/64bit} size of single element |
| pscan.poll | r1, r2 | r1 = register to receive status return;<br>r2 = ID of collective tree |

*FIG. 5*

PORT TABLE 700

| PORT | DESCRIPTION | NOTES |
|---|---|---|
| 0 | HSIO port 0 | Not used in FIG. 8 |
| 1 | HSIO port 1 | Not used in FIG. 8 |
| 2 | Intra-tile X-axis | Notated as X in FIG. 8 |
| 3 | Intra-tile Y-axis | Notated as Y in FIG. 8 |
| 4 | Intra-tile diagonal | Notated as D in FIG. 8 |
| 5 | Inter-tile positive X-axis port 0 | Notated as Sk0+ in FIG. 8 |
| 6 | Inter-tile negative X-axis port 0 | Notated as Sk0- in FIG. 8 |
| 7 | Local Core | Notated as L in FIG. 8 |
| 8 | Inter-tile positive X-axis port 1 | Not used in FIG. 8 |
| 9 | Inter-tile negative X-axis port 1 | Not used in FIG. 8 |

```
RECEIVE, AT A NODE INCLUDED AMONG A PLURALITY OF NODES
RESIDENT ON A SAME SEMICONDUCTOR PACKAGE, AN INSTRUCTION
INDICATING A LOGICAL TREE TO MAP TO A NETWORK TOPOLOGY
THAT INCLUDES THE NODE, THE INSTRUCTION ASSOCIATED WITH A
PREFIX-SCAN OPERATION
1002
```

```
CONFIGURING A REGISTER OF A SET OF REGISTERS MAINTAINED AT
THE NODE BASED ON THE LOGICAL TREE, THE REGISTER
CONFIGURED TO INDICATE WHERE TO FORWARD A VALUE RELATED
TO THE PREFIX-SCAN OPERATION, WHEREIN THE VALUE IS TO BE
RECEIVED VIA AN INPUT PORT IDENTIFIED IN THE CONFIGURED
REGISTER,
1004
```

FIG. 10

Storage Medium 1100

Computer Executable Instructions for 1000

FIG. 11

TECHNIQUES FOR ACCELERATION OF A PREFIX-SCAN OPERATION

STATEMENT OF GOVERNMENT RIGHTS

This invention was made with Government support under Agreement No. HR0011-17-3-004, awarded by DARPA. The Government has certain rights in the invention.

TECHNICAL FIELD

Examples described herein are generally related to techniques for an in-network acceleration of a parallel prefix-scan operation.

BACKGROUND

Prefix-scan is an operation used extensively for parallel algorithms. Applications or usage of pre-scan operations range from scheduling workloads to load balance work across a distributed compute system to implementing several parallel algorithms efficiently. Some examples of parallel algorithms where the prefix-scan is used extensively are sorting, solving tridiagonal linear systems, performing lexical analysis, searching for regular expressions, among others.

BRIEF DESCRIPTION OF THE DRAWINGS

FIG. 5 illustrates an example instruction table.
FIG. 7 illustrates an example port table.
FIG. 10 illustrates an example logic flow.
FIG. 11 illustrates an example of a storage medium.

DETAILED DESCRIPTION

As contemplated by this disclosure, prefix-scan is an operation used extensively for parallel algorithms. Prefix-scan operations are typically implemented using software techniques that include a prefix-scan as a basic function in several libraries. A state-of-the-art algorithm implemented in software may use multiple passes on a logarithmic tree defined by the software. Use of a logarithmic tree by the algorithm may be relatively efficient, but it requires multiple passes over the tree. The multiple passes cause an increase in overall latency of a prefix-scan operation. Also, a prefix-scan operation, when implemented by software, is not given priority through a distributed system and may experience jitter. The increase in overall latency and jitter reduce overall efficiency of the distributed system, especially for system software and management entities of the distributed system.

An emerging technology that is optimized for large scale graph analytics may be referred to as Programmable Integrated Unified Memory Architecture (PIUMA). PIUMA is designed around many multi-threaded core nodes that utilize up to 8-byte memory transactions to take advantage of fine-grained memory and network accesses. The multi-threaded core nodes may globally share address space and have powerful offload engines. The many multi-threaded core nodes of PIUMA provide a hardware mechanism for scheduling work across a relatively large distributed system via, for example, a prefix-scan operation.

In some examples, as described more below, a hardware mechanism for implementing a prefix-scan operation may by performed via use of reductions in flight in a network of multi-threaded core nodes based on a logical tree created over the network. In addition, the hardware mechanism may perform a prefix-scan operation at a higher priority over other traffic in the network. The higher priority may be an important aspect for load balancing workloads at scale in a distributed system. A prefix-scan operation may be implemented in a pipelined manner to be able to produce an element wise prefix-scan for a bit vector of arbitrary length. Also, since the reductions are mapped to the network topology, per core node reductions can be done in an energy efficient manner that minimizes data movement.

Figure 1:
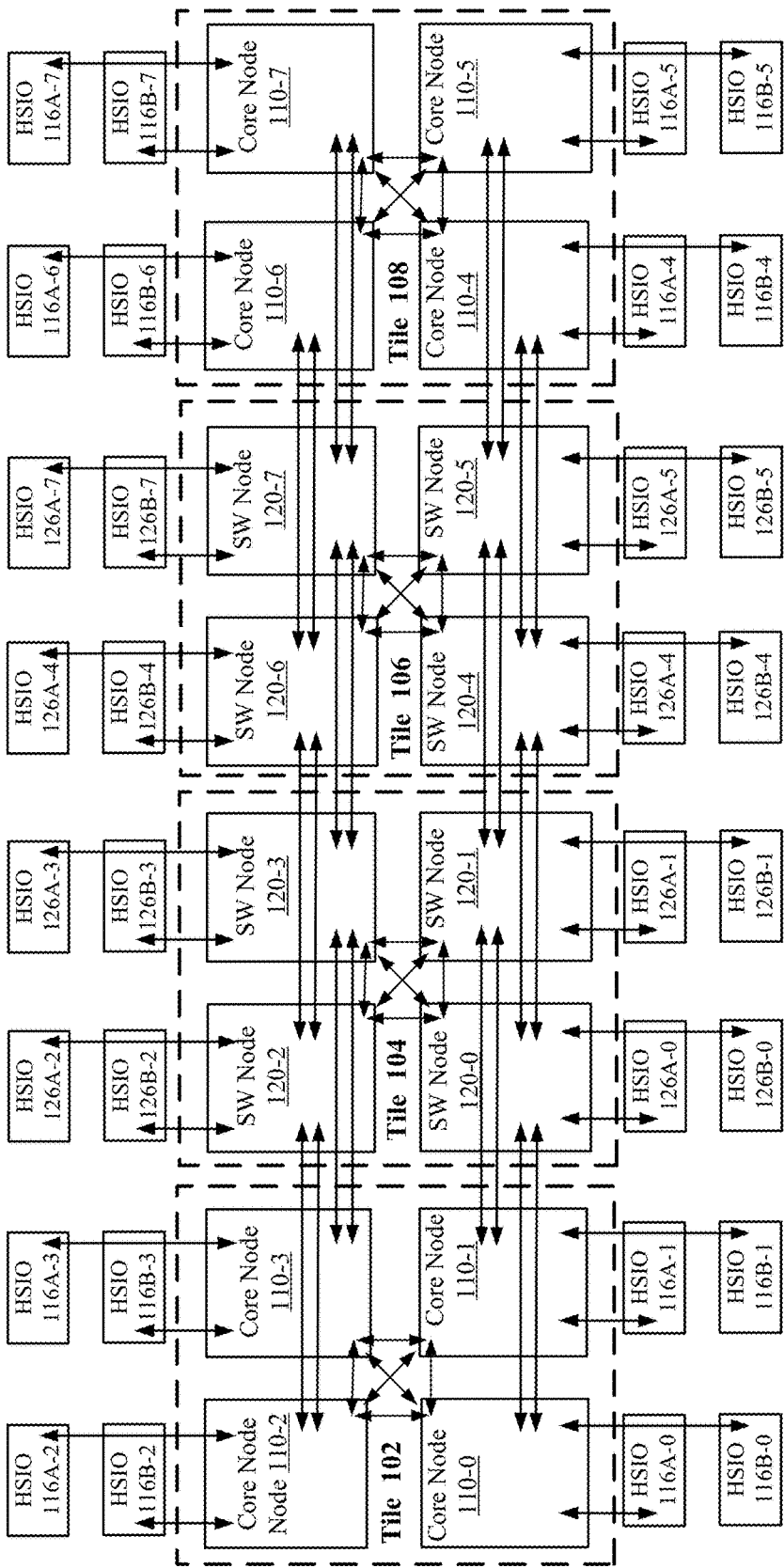
FIG. 1 illustrates an example system.

FIG. 1 illustrates an example system 100. According to some examples, system 100 may be elements of a PIUMA system-on-chip (SoC), die or semiconductor package that provides a scalable machine targeting sparse-graph applications. As shown in FIG. 1, system 100 may represent a high-level diagram of a single PIUMA SoC. For these examples, system 100 includes eight multi-threaded core nodes 110-0 to 110-7, each core having a corresponding intra-die or intra-package switch (not shown) to allow packets into and out of a scalable system fabric. Also, core nodes 110-0 to 110-7 may each separately couple to two high speed input/outputs (HSIOs) 116A/B-0 to 116A/B-7 to allow for inter-die or inter-package connectivity across multiple PIUMA SoCs/dies/semiconductor packages in a larger PIUMA system (e.g., maintained on a same or different board, same or different compute platform nodes or same or different racks).

According to some examples, in order to support in-die or in-semiconductor package network porting to HSIOs and inter-die connectivity, system 100 includes eight switch (SW) nodes 120-0 to 120-7 having respective HSIOs 126A/B-0 to 126 A/B-7. As shown in FIG. 1, SW nodes 120-0 to 120-7 may couple with respective core nodes 110-0 to 117-7 as illustrated by respective parallel pairs of double arrows. As described more below, SW nodes 120-0 to 120-7 may also include an intra-die switch similar to what is included in core nodes 110-0 to 110-7 but SW nodes 120-0 to 120-7 do not include compute resources (e.g., a collective engine). For these examples, SW nodes 120-0 to 120-7 may merely forward values associated with a prefix-scan operation via their respective intra-die switches.

In some examples, as shown in FIG. 1, a network topology that includes groupings of four core nodes or four SW nodes as tiles. For example, tile 102 include core nodes 110-0 to 110-3, tile 104 includes SW nodes 120-0 to 120-3, tile 106 includes SW nodes 120-4 to 120-7, and tile 108 includes core nodes 110-4 to 110-7. A cluster of arrows shown in FIG. 1 for each of tiles 102, 104, 106 and 108 signify possible routes for an intra-die, switch-based collective prefix-scan operation. Examples in this disclosure will describe more details below of this switch-based collective prefix-scan operation.

According to some examples, elements of system 100 may implement a prefix-scan operation in flight in at least a portion of a network the includes the elements of system 100. A formulation of an inclusive version of a problem a prefix-scan operation may be provided by as:

$y0=x0$ $y1=x0 \oplus x1$ $yi=x0 \oplus x1 \oplus x2 \ldots \oplus xi$ where, yi is an output of the ith node, xi is an input of the ith node and ⊕ is the operation to be performed. Similarly, an exclusive version of the problem ignores a node's own contribution xi in an output. As described more below, techniques for an in-network acceleration of a parallel prefix-scan operation may accelerate both inclusive and exclusive prefix-scan operations. The inclusive and exclusive versions may be achieved via use of different configuration registers maintained at a respective core node, for example, from among core nodes 110-0 to 110-7.

In some examples, as described in more detail below, intra-die switches separately included in core nodes 110-0 to 110-7 may have register configurations that specify whether an input port participates in a function (min, max., sum, etc.) to be performed by a respective core node's compute resources that results in a local operation. If a register configuration indicates that an input port of a core node does not perform a local operation, the core node may be configured to pass data through to a particular output port indicated in the register configuration. If the register configuration indicates the input port is to participate in a local operation, then the operation is performed by the core node's compute resources when all ports of the core node have their corresponding inputs to be used in the local operation. When a particular local operation is completed at a core node, results are forwarded to an identified output port of the core node's intra-die switch. Indications of where corresponding inputs are expected to be received and where to forward results for a local operation may be part of a second set of configurable registers associated with compute resources. As provided in more detail below, configuration of input ports and output ports of an intra-die switch allows a mapping of a logical tree on top of system 100's network topology that includes core nodes 110-0 to 110-7 and SW nodes 120-0 to 120-7. A prefix-scan operation of a vector of elements at each core node participating in a local operation may be executed or performed in a pipelined fashion.

In some examples, dedicated virtual channels may be provided to assign a higher priority through system 100's intra-die/SoC/semiconductor package network topology such that a prefix-scan operation's view is of an unloaded network. For these examples, deadlock freedom may be ensured by mutually exclusive configuration settings of input/outputs to avoid circular paths through system 100's intra-die network.

According to some examples, a semiconductor package may be a metal, plastic, glass, or ceramic casing including one or more discrete semiconductor devices or integrated circuits. For these examples, individual components of a semiconductor package may be fabricated on semiconductor wafers (commonly silicon) before being diced into die, tested, and packaged. A semiconductor package provides a means for connecting the semiconductor package to an external environment, such as a printed circuit board, via leads such as lands, balls, or pines; and protection against threats such as mechanical impact, chemical contamination, and light exposure.

Figure 2:
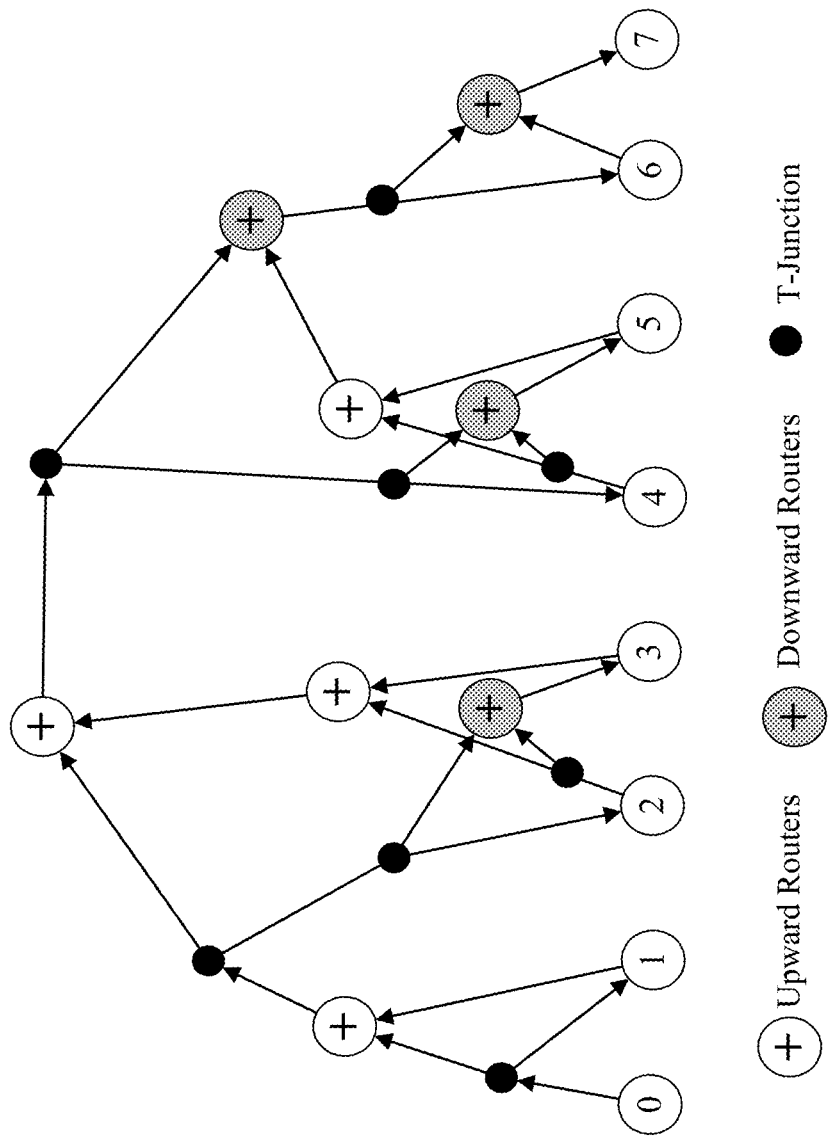
FIG. 2 illustrates an example first tree.

FIG. 2 illustrates an example tree 200. In some examples, a prefix-scan operation may be mapped on a collective or logical tree such as example tree 200. A logical or collective tree such as tree 200 may be created over any network. For these examples, nodes of tree 200 that are numbered in FIG. 2 are sources that are participating in the prefix-scan operation. Nodes identified as "upward routers" perform an operation and pass a respective result up tree 200 as shown in FIG. 2. Nodes identified as "downward routers" perform an operation and pass a respective result down tree 200 as shown in FIG. 2. Nodes identified as "T-junction", duplicate a value across multiple paths of logical tree 200. A mapping of a logical or collective tree such as tree 200 to a network topology may be achieved, as described more below, by setting configuration bits of registers maintained at the various nodes included in tree 200. The various nodes may include core nodes and switch nodes similar to core nodes 110-0 to 110-7 and SW nodes 120-0 to 120-7 shown in FIG. 1 and described above.

Figure 3:
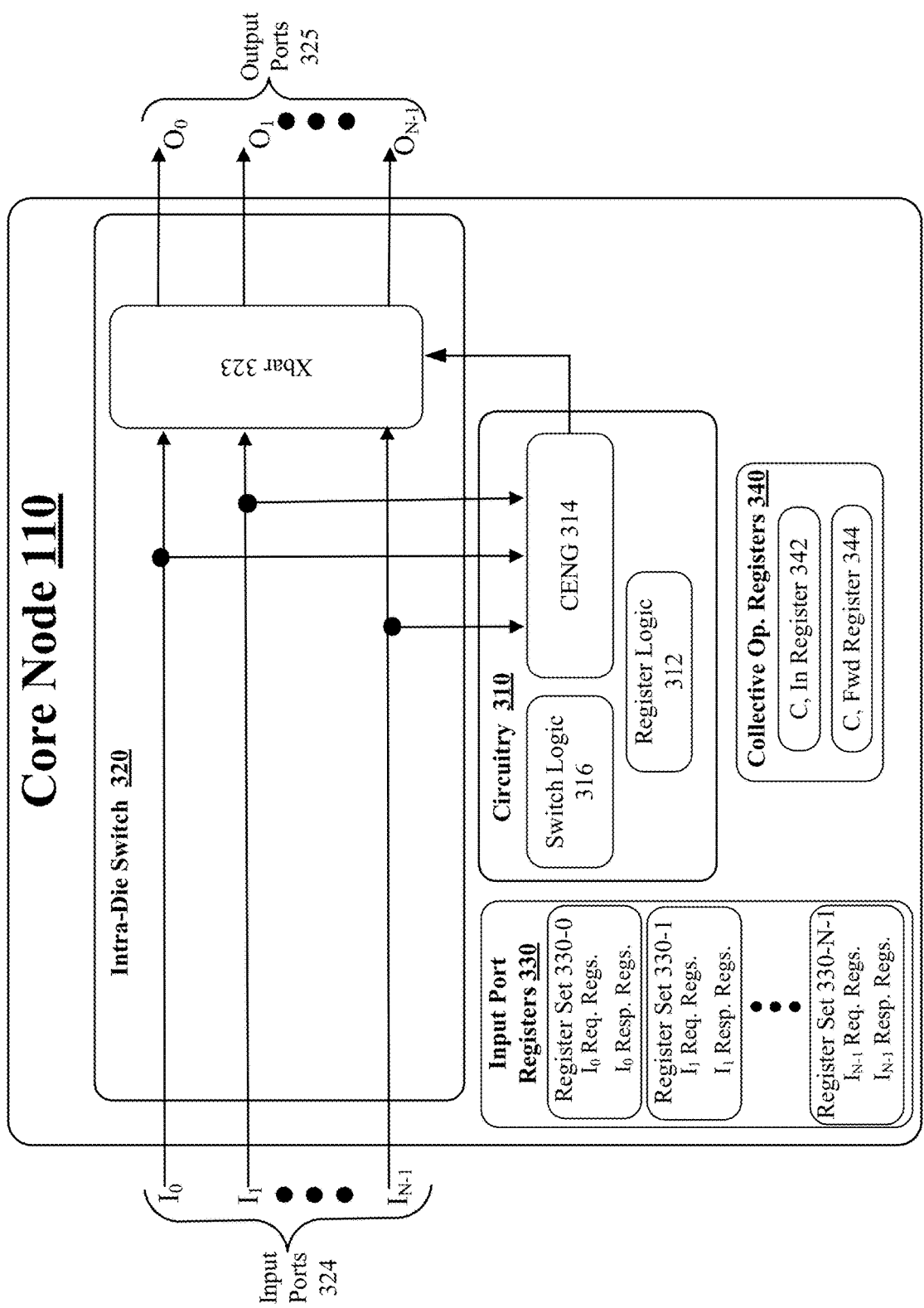
FIG. 3 illustrates an example core node.

FIG. 3 illustrates an example core node 110. Core node 110 shown in FIG. 3 provides a more detailed view of what core nodes 110-0 to 110-7 shown in FIG. 1 may include. Core node 110 includes circuitry 310, intra-die switch 320, input port registers 330 and collective operation registers 340. In some examples, as shown in FIG. 3, circuitry 310 includes register logic 312, collective engine (CENG) 314 and switch logic 316. Registers included in input port registers 330 or collective operation registers 340 may be selectively configured by register logic 312 responsive to an instruction (described more below) received from a requestor of a collective prefix-scan operation (e.g., a graph analytics software application), the instruction to identify a logical or collective tree mapped to a network topology that includes core node 110. CENG 314 includes processing resources (e.g., arithmetic logic units) that may or may not be utilized to participate in the collective prefix-scan operation as indicated in configured input port registers 330 or collective operation registers 340. Switch logic 316 may determine where to route values received via input ports of core node 110 based on selectively configured input port registers 330 or collective operation registers 340.

According to some examples, intra-die switch 320 is shown in FIG. 3 as including input ports 324, output ports 325 and a crossbar (Xbar) 323 coupled with input ports 324 and output ports 325. The number of input ports 324 or output ports 325 for intra-die switch 320 may be represented by N, where N is any number greater than or equal to 2. Input port registers 330 may include per input port configuration registers to indicate to switch logic 316 how these input ports are part of a mapping of the logical or collective tree to the network topology that includes core node 110. As shown in FIG. 3, each port included in input ports 324 may have a set of two configuration registers that may be configured by register logic 312 based on the logical or collective tree. For example, $I_0$ has a register set 330-0, $I_1$ has a register set 330-1 and $I_{N-1}$ has a register set 330-N-2. A first register of each set may be a request (Req) configuration register to indicate a forward or upward path of the logical or collective tree. A second register of each set may be a response (Resp) configuration register to indicate a reverse or downward path of the logical or collective tree.

In some examples, a per input port Req configuration register for input ports 324 may consist of a bit vector that indicates to switch logic 316 whether an input port is part of a local operation that involves CENG 314 executing a function of a prefix-scan operation or if the input port is bypassed to an output port included in output ports 325, e.g., does not forward data or values to CENG 314. As such, a size of a Req bit vector equals a number of output ports+1 that are included in output ports 325. The additional bit, for example, may be an indication in the Req bit vector for switch logic 316 to determine whether or not values received via the input port will be forwarded to CENG 314 for core node 110's participation in the prefix-scan operation. In another example, it is not necessary that the input port have a bit set in the Req bit vector to indicate participation. For this other example, all the Req bit vector bits could be 0s to indicate to switch logic 316 that no participation of core node 110's in the prefix-scan operation is expected.

According to some examples, bits in a per input port Req bit vector representing output ports included in output ports 325 are to be mutually exclusive across all input ports included in input ports 324. In other words, there is only a mutually exclusive one-to-many mapping between a given input port and an output port via which switch logic 316 is to forward values or results. This does not apply to examples where the Req bit vector bit indicates to switch logic 316 whether the values received via the input port will be forwarded to CENG 314 to participate in the prefix-scan operation.

In some examples, a per input port Resp configuration register for input ports 324 may consist of a Resp bit vector that indicates to switch logic 316 whether a value or result received at an input port is to be forwarded to an output port or forwarded to CENG 314 to participate in the prefix-scan operation. Unlike a Req bit vector, all bits of a Resp bit vector are to be mutually exclusive across all input ports 324. In other words, there is only a mutually exclusive one-to-many mapping from input ports 324 to either an output port or CENG 314.

In some examples, as briefly mentioned above, CENG 314 may be configured to serve as a compute resource to execute a function associated with a collective prefix-scan operation that is mapped to core node 110 according to a logical or collective tree. CENG 314 may include and/or have access to collective operation registers 340. As shown in FIG. 3, collective operation registers 340 include a collective input (C, In) register 342 and a collective forward (C, Fwd) register 344. For these examples, C, In register 342 may consist of a C, In bit vector that indicates to CENG 314 those input ports expected to receive values from other core nodes participating in the collective prefix-scan operation. In other words, those input ports from among input ports 324 that are routing data or values to CENG 314 for processing as part of the collective prefix-scan operation. Also, for these examples, C, Fwd register 342 may consist of a C, Fwd bit vector to indicate to switch logic 316 an output port from among output ports 315 that a result or value generated by CENG 314 is to be forwarded to through Xbar 323.

According to some examples, the C, Fwd bit vector is mutually exclusive with Req bit vectors. This is required to ensure that a generated result is not being forwarded by switch logic 316 on an output port that also an input port mapped to that same output port.

In some examples, C, In register 342 may be configured by register logic to enable CENG 314 to determine when all input ports expected to receive data or values have been received for CENG 314 to initiate its processing to complete its part of the collective prefix-scan operation. The C, In bit vector from configured C, In register 342 may also be used by switch logic 316 in a reverse broadcast phase to determine which ports to send the result to during a reverse broadcast.

According some examples, it is envisioned that the forward path (Req) and the reverse path (Resp) of the prefix-scan operation are routed on separate virtual channels of the network topology to avoid deadlocks. For example, a large array element-wise prefix-scan operation progresses with each element of the array pipelined through the network. If all the input ports participating in a local operation at an intra-die switch hop are not ready, the prefix-scan operation stalls till all the input ports are ready. The deadlock freedom may be guaranteed by restrictions on the configuration registers included in input port registers 330 or collective operation registers 340 and through mapping of the collective tree on a network topology that avoids any circular paths.

In some examples, CENG 314 may be configured to included processing resources such as an arithmetic logic unit (ALU) tree to execute its local function of a collective prefix-scan operation. Although CENG 314 is shown as an individual block within FIG. 3, it need not be implemented as such and can instead be distributed across intra-die switch 320 to reduce the number of wires required to bring data or values to or send data or values from CENG 314. Also, a data path to CENG 314 shown in FIG. 3 may not be for an entire packet or flit but may be for up to an 8B element and an opcode (add/multiply) for the type of local operation being performed by CENG 314.

According to some examples, a register overhead to support input port registers 330 and collective operation registers 340 may be a relatively small data size. A number of total bits required to support input port registers 330 and collective operation registers 340 may=$2*(N^2+N)$, where N is the number of input ports. So, an intra-die switch having 8 ports would translate into $2*(8^2=8)=144$ bits or 18 bytes.

Figure 4:
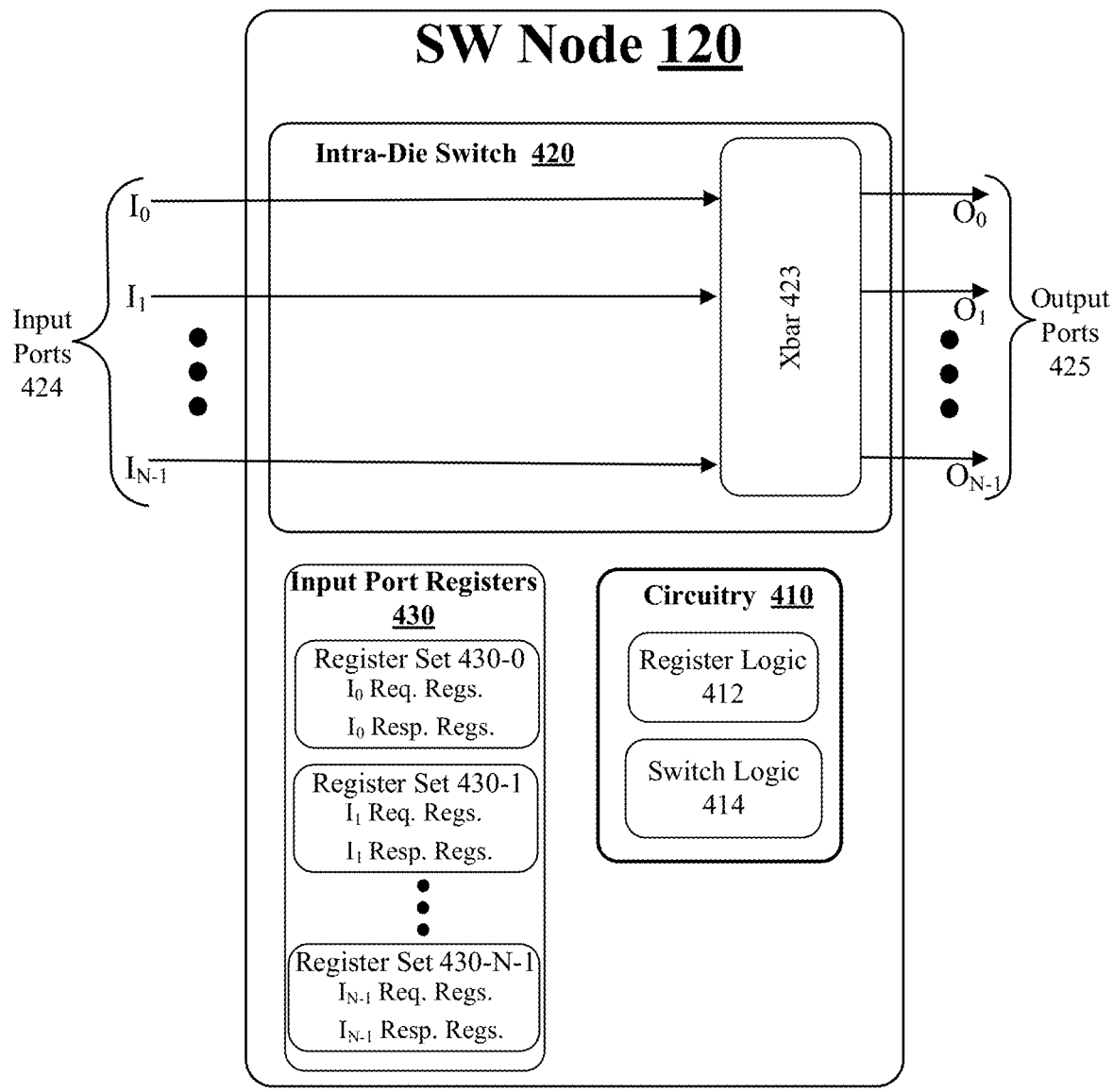
FIG. 4 illustrates an example switch.

FIG. 4 illustrates an example SW node 120. In some examples, SW node 120 shown in FIG. 4 provides a more detailed view of what SW nodes 120-0 to 120-7 shown in FIG. 1 may include. For these examples, SW node 120 includes circuitry 410, an intra-die switch 420 and input port registers 430. In some examples, as shown in FIG. 4, circuitry 410 includes register logic 412 and switch logic 414. Registers included in input port registers 430 may be selectively configured by register logic 412 responsive to an instruction (described more below) received from a requestor of a collective prefix-scan operation (e.g., a graph analytics software application), the instruction to identify a logical or collective tree mapped to a network topology that includes SW node 120. Switch logic 414 may determine where to route values received via input ports of SW node 120 based on selectively configured registers 430.

According to some examples, intra-die switch 420 is shown in FIG. 4 as including input ports 424, output ports 425 and a crossbar (Xbar) 423 coupled with input ports 424 and output ports 425. The number of input ports 424 or output ports 425 for intra-die switch 420 may be represented by N. Input port registers 430 may include per input port configuration registers to indicate to switch logic 414 how these input ports are part of a mapping of the logical or collective tree to the network topology that includes SW node 120. As shown in FIG. 4, each port included in input ports 424 may have a set of two configuration registers that may be configured by register logic 422 based on the logical or collective tree. For example, $J_0$ has a register set 430-0, $I_1$ has a register set 430-1 and $I_{N-1}$ has a register set 430-N-2. A first register of each set may be a Req configuration register for a forward or upward path of the logical or collective tree. A second register of each set may be a Resp configuration register for a reverse or downward path of the logical or collective tree.

In some examples, a per input port Req configuration register for input ports 424 may consist of a bit vector that indicates to switch logic 414 which output port among output ports 425 a value or result received at an input port from among input ports 424 is to be forwarded, the value or result generated by one or more core nodes for the collective prefix-scan operation. Since SW node 120 does not include a CENG, a last bit of the bit vector is always 0. As such, a size of a Req bit vector equals a number of output ports+1 that are included in output ports 415. In other examples, the last bit may be removed and Req bit vector equals the number of output ports.

According to some examples, bits in a per input port Req bit vector representing output ports included in output ports 415 are to be mutually exclusive across all input ports included in input ports 414. In other words, there is only a mutually exclusive one-to-many mapping between a given input port and an output port via which switch logic 414 is to forward values or results.

In some examples, a per input port Resp configuration register for input ports 414 may consist of a Resp bit vector that indicates to switch logic 414 which output port to forward a result or value in relation to a mapped collective tree for a prefix-scan operation in a reverse or downward path. Unlike a Req bit vector, all bits of a Resp bit vector are to be mutually exclusive across all input ports 414. In other words, there is only a mutually exclusive one-to-many mapping from input ports 414 to an output port from among output ports 415.

FIG. 5 illustrates example instruction table 500. In some examples, as shown in FIG. 5, instruction table list two instructions that include pscan.{add/mul} and pscan.poll. For these examples, the two instructions may be related to executing in-network prefix-scan operations for a PIUMA network such as shown in FIG. 1 for system 100. A pscan.{add/mul} instruction may be used to initiate a prefix-scan operation at a given PIUMA core node. The "r1" argument or input of a pscan.{add/mull} instruction indicates a pre-configured collective tree identifier (ID) that maps a prefix-scan operation to a network topology that includes the given PIUMA core node and associated other core nodes and SW nodes included in the network topology. The "r2" argument or input indicates a base address of source data array stored to a memory, the "r3" argument indicates a base address of destination data array, the "r4" argument indicates a count of elements in array and the "SIZE" argument indicates a size of a single element. A single element to represent a block a data to be processed by a CENG and/or forwarded by input ports of core nodes or SW nodes included in the network topology.

According to some examples, a PIUMA network may implement a hardware distributed global address space (DGAS), which enables each core node or SW node in a PIUMA network to uniformly access memory across all core nodes and SW nodes in the PIUMA network with one address space. Each core node or SW node has a local scratchpad and a memory channel (e.g., dynamic random access memory (DRAM) channel) associated with the DGAS. Therefore, it is expected that base addresses indicated in r2 and r3 of a pscan.{add/mul} instruction are placed in local memory locations upon receipt of a pscan.{add/mul} instruction.

In some examples, a pscan.poll instruction allows for a requestor (e.g., a graph analytics software application) to check a status (done/not done) of a current a prefix-scan operation mapped to the collective tree identified in this instruction.

According to some examples, intra-die switches included in core nodes or SW nodes in a PIUMA network may be configured to support multiple collective trees. A tradeoff being an amount of overhead in configuration registers (e.g., input port registers 330 or collective operation registers 340) needed to store each collective tree ID. A collective tree ID must be the same for all core nodes of SW nodes participating and or included in that collective tree.

In some examples, CENGs included in PIUMA network may be responsible for: (1) receiving and decoding receive instructions such as pscan.{ad/mul} or pscan.poll; (2) fetching values from source memory and pushing these values to other core nodes participating in a collective prefix-scan operation (e.g., via local input port into its intra-die switch); (3) receiving each response value back; and (4) storing each value into its proper location in a destination memory array. Also, for all core nodes participating in the collective prefix-scan operation, each element sent into the PIUMA network by a respective core node returns a response value. Therefore, each element in the destination array will be a result value for the corresponding element in the source array. Source values sent into the PIUMA network will have their responses return in the same order.

Figure 6:
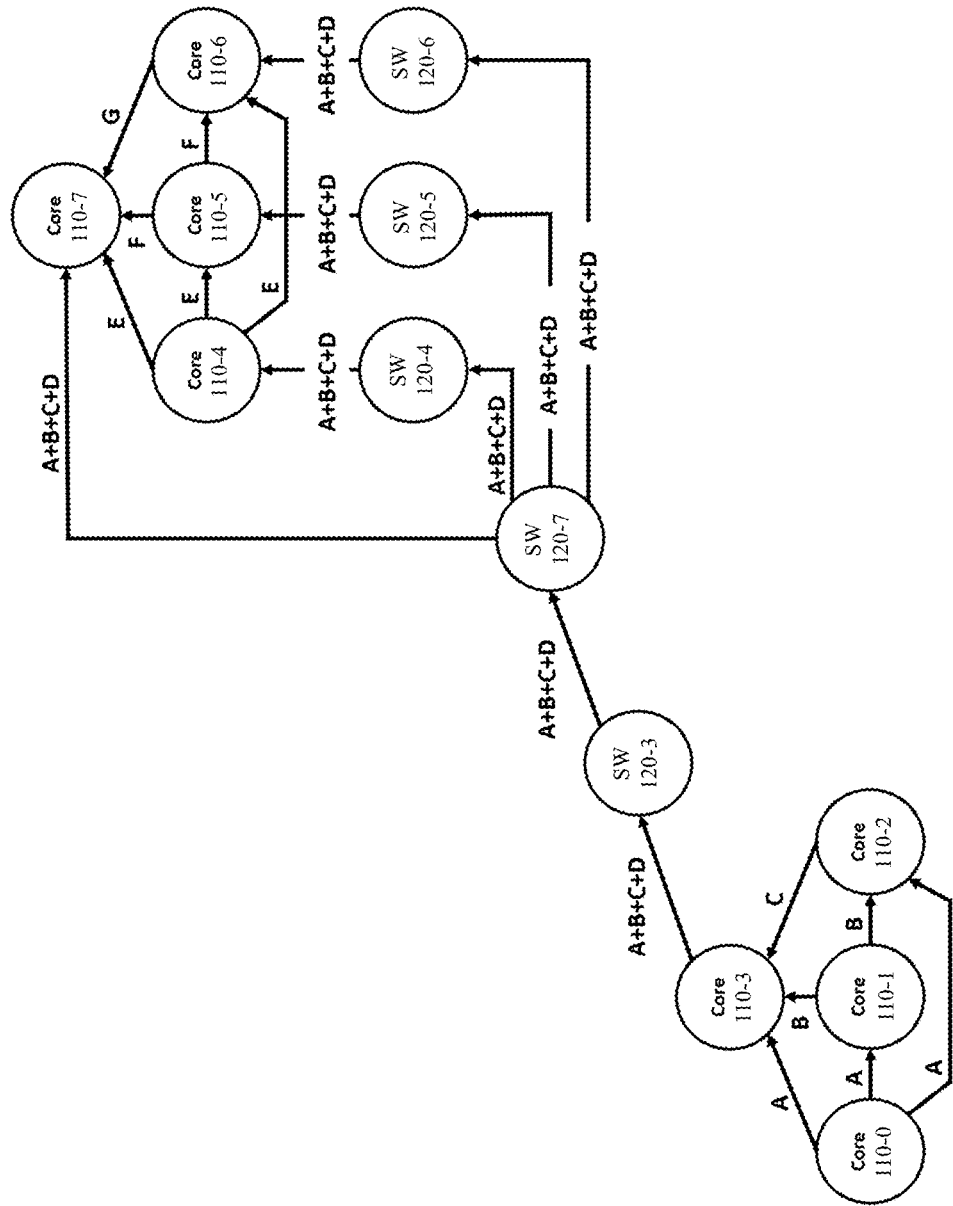
FIG. 6 illustrates an example second tree.

FIG. 6 illustrates an example tree 600. In some examples, tree 600 represents a logical or collective tree to map a prefix-scan operation over a network topology shown in FIG. 1 as including core nodes 110-0 to 110-7 and SW nodes 120-0 to 120-7. For these examples, an order of the mapped prefix-scan operation mirrors core node IDs. That is, core node 110-0 is the lowest entry in logical tree 600 in the prefix-scan operation and core node 110-7 is the highest entry in logical tree 600. Each of the core nodes contributes a unique value to be reduced as part of the prefix-scan operation. For example, as shown in FIG. 6, core node 110-0 contributes "A", core node 110-1 contributes "B", core node 110-2 contributes "C", etc.

In some examples, as will be described in more detail below, tree 600 indicates that core nodes 110-0 to 110-3 included in tile 102 may utilize SW nodes included in tile 104 (SW node 120-3) and tile 106 (SW nodes 120-4 to 120-7) to forward calculated values "A+B+C+D" to core nodes 110-4 to 110-7 included in tile 108. For these examples, a final result based on "A+B+C+D" and the unique values of E+F+G may be based on core node 110-7 adding its unique value of "H" (not shown in FIG. 6) to generate the final result.

FIG. 7 illustrates an example port table 700. In some examples, port table 700 illustrates how registers utilized by intra-die switches of core nodes or SW nodes or CENGs of core nodes may be configured and used for prefix-scan operations. For these examples, contents of port table 700 are based on the network topology shown in FIG. 1. Also, the numbered ports included in the port column of port table 700 correspond to an ordering in bits vectors configured in input port registers 330/430 or collective operation registers 340 and shown in FIG. 8 as described below for scheme 800. The ordering of the bit vector may be responsive to receiving an instruction that identifies a logic tree mapped to the network topology. Terms that include "intra-tile" in the description column of port table 700 indicate ports coupled with other core nodes or SW nodes in a same tile (e.g., core nodes 110-0 to 110-3 of tile 102 or SW nodes 120-0 to 120-3 of tile 104). Terms that include "inter-tile" in the description column of port table 700 indicate ports coupled with core nodes or SW nodes included in other tiles.

Figure 8:
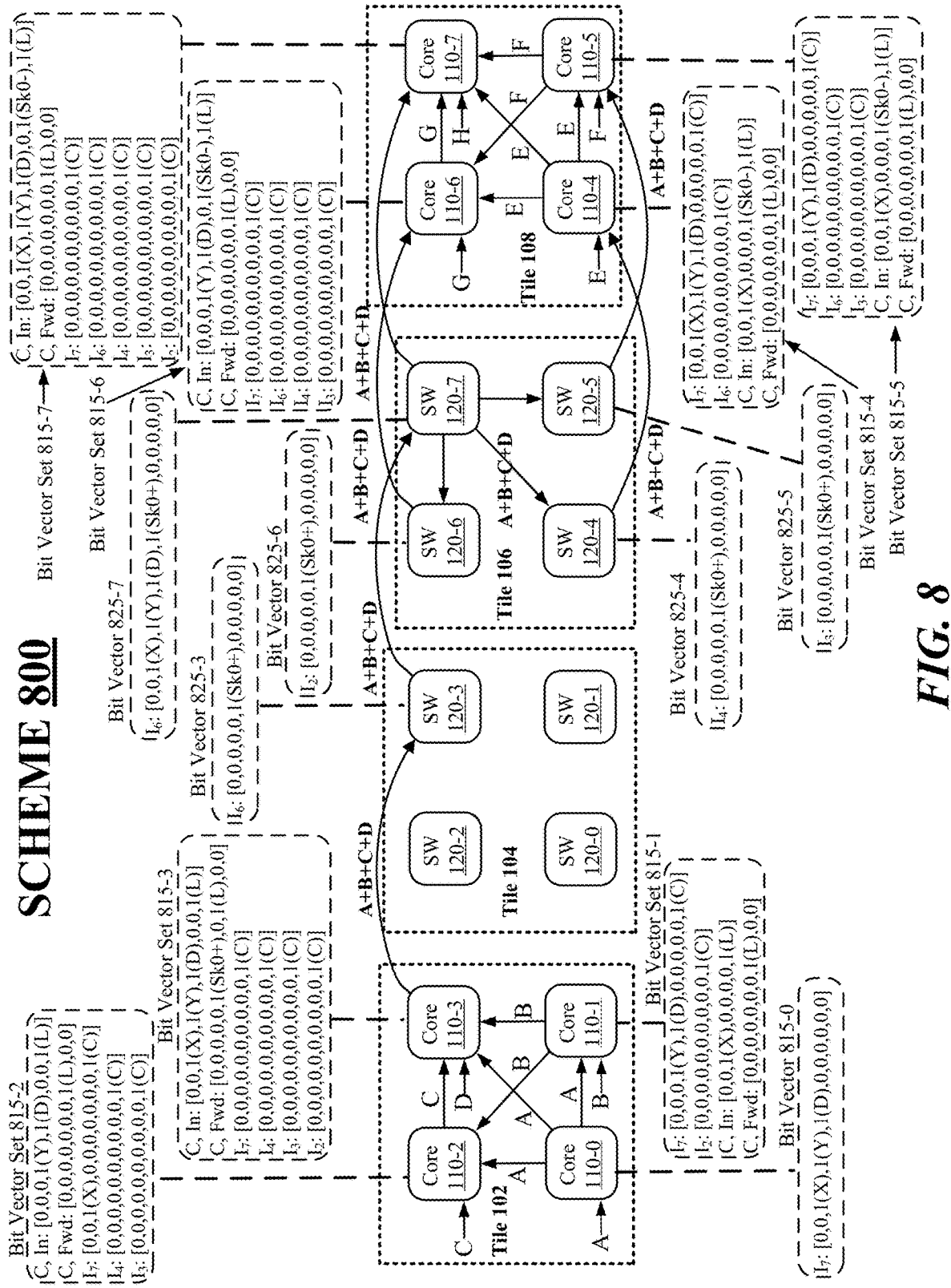
FIG. 8 illustrates an example scheme.

FIG. 8 illustrates an example scheme 800. According to some examples, scheme 800 may be implemented based on a collective prefix-scan operation mapped to the network topology shown in FIG. 1 according to logical or collective tree 600 that causes respective nodes to configure registers to facilitate implementation of the collective prefix-scan operation. As shown in FIG. 8, simplified versions of core nodes 110-0 to 110-7 and SW nodes 120-0 to 120-7 are depicted as well as their respective tiles 102, 104, 106 and 108. For these examples, scheme 800 depicts how bit vectors for configured registers facilitate core nodes 110-0 to 110-7 execution of the collective prefix-scan operation and also facilitate SW nodes 120-0 to 120-7 forwarding of values between core nodes included in different tiles to complete the execution of the collective prefix-scan operation.

In some examples, for scheme 800, port table 700 is used as a reference to indicate which bits of a respective bit vector provide directions to an input port or CENG as to where results are to be sent via an output port or to indicate where input values are expected to be received by input ports of core nodes having CENGs participating in the collective prefix-scan operation. For example, bit vector 813-0 for core node 110-0 is shown in FIG. 8 as an 11-bit bit vector for input port 17 of [0, 0, 1(X), 1(Y), 1(D), 0, 0, 0, 0, 0, 0]. Referring to port table 700, ports "2", "3" and "4" respectively indicate an intra-tile X-axis port, an intra-tile Y-axis port and an intra-tile diagonal port. Bit vector 813-0 has a third, fourth and fifth bits from the left that correspond to respective ports 2, 3 and 4 of port table 700. As shown in FIG. 8, the third (port 2), fourth (port 3) and fifth (port 4) bits are asserted in bit vector 813-0 to indicate that core node 110-0 is to route its value "A" receive via input port 17 to output ports directed to an X-axis (horizontal) output port that couples with core node 110-1, Y-axis (vertical) output port that couples with core node 110-2 and a diagonal output port that couples with core node 110-3. For these examples, the last bit (C-bit) is not asserted to indicate that core node 110-1 is not participating in the collective prefix-scan operation and is merely forwarding its unique value to other core nodes in tile 102. For these examples, input port registers 330 for core node 110-1 may have been configured responsive to core node 110-1 receiving a pscan.add/mul) instruction via which tree 600 is identified as the collective tree for the collective prefix-scan operation.

According to some examples, bit vector set 815-3 may consist of bit vectors for configured input port registers 330 and collective operation registers 340 maintained at core node 110-3. For example, the bit vectors for input ports $I_7$, $I_4$, $I_3$ and $I_2$ may be based on configured Req registers included in input port registers 330 and C, In and C, Fwd may be based on configured registers included in collective operation registers 340 of core node 110-3. As shown in FIG. 8, the last or $11^{th}$ bit of the bit vectors for input ports 7, 4, 13 and $I_2$ indicates all these ports are participating in the collective prefix-scan operation. In other words, values received via these input ports are forward to core node 110-3's CENG for processing. For these examples, the bit vector for C, In of [0, 0, 1(X), 1(Y), 1(D), 0, 0, 1(L)] indicates from which core nodes are expected to send values to core node 110-3 as part of the collective prefix-scan operation. Assertion of the third (port 2), fourth (port 3) and fifth (port 4) bits indicate that core node 110-2 is expected to route its value "C" via core node 110-3's X-axis input port, core node 110-1 is expected to route its value "B" via core node 110-3's Y-axis input port and core node 110-0 is expected to route its value "A via core node 110-3's diagonal input port. Also, for these examples, the bit vector for C, Fwd of [0, 0, 0, 0, 0, 1(Sk0+), 0, 1(L), 0, 0] indicates where core node 110-3's is to forward results generated by its CENG. Assertion of the C, Fwd bit vector's $6^{th}$ bit (port 5) and $8^{th}$ bit (port 7) indicate that core node 110-3 is to forward results to its inter-tile positive X-axis port 0 and to its local core node (e.g., for local memory storage). As shown in FIG. 8, the forwarding of core node 110-3 results via its inter-tile positive X-axis cause results "A+B+C+D" to be forwarded to SW node 120-3 of tile 104. For these examples, input port registers 330 and collective operation registers 340 for core node 110-3 may have been configured responsive to core node 110-3 receiving a pscan.{add/mul} instruction via which tree 600 is identified as the collective tree for the collective prefix-scan operation.

In some examples, as shown in FIG. 8 and also as depicted in tree 600, the next movement of results from SW node 120-3 is to SW node 120-7 at tile 106. For these examples, bit vector 825-3 indicates that the $6^{th}$ bit is asserted to cause SW node 120-3's intra-die switch to forward results A+B+C+D to its inter-tile positive X-axis port 0 that couples to SW node 120-7. SW node 120-7 may forward results A+B+C+D to the three other SW nodes included in its tile 106 as indicated by the assertion of the $3^{rd}$, $4^{th}$ and $5^{th}$ bits in bit vector 825-7. Also, as shown in FIG. 8, bit vectors 825-7, 825-4 and 825-5 indicate forwarding of values to corresponding respective core nodes 110-7, 110-4 and 110-5 via assertion of each bit vectors' $6^{th}$ bit. For these examples, input port registers 330 for SW nodes 120-3, 120-4, 120-5, 120-6 and 120-7 may have been configured responsive to receipt of a pscan.{add/mul} instruction via which tree 600 is identified as the collective tree for the collective prefix-scan operation.

According to some examples, as shown in FIG. 8 and also as depicted in tree 600, the last core node to receive results is core node 110-7. For these examples, the last or $11^{th}$ bit of the bit vectors for input ports $I_7$, $I_6$, $I_4$, $I_3$ and $I_2$ of bit vector set 815-7 indicates all these ports are participating in the collective prefix-scan operation for core node 110-7. Core node 110-7 is to receive results "A+B+C+D" and results E+F+G+H via these ports. Also, the $3^{rd}$, $4^{th}$, $5^{th}$, $7^{th}$ and $8^{th}$ bits of C, In are asserted to indicate that these values are received from SW node 120-7 and core nodes 110-4 to 110-6. Finally, the $6^{th}$ bit of C, Fwd indicates that core node 110-7's results are to only be forwarded to its local core node to complete the collective prefix-scan operation. For these examples, input port registers 330 and collective operation registers 340 for core node 110-7 may have been configured responsive to core node 110-7 receiving a pscan.add/mul instruction via which tree 600 is identified as the collective tree for the collective prefix-scan operation.

Only a portion of the bit vectors shown in FIG. 8 are described above to demonstrate how tree 600 may be mapped to a network topology to facilitate execution of a collective prefix-scan operation. The other bit vectors not described in detail include bit vectors included in bit vector sets 815-1, 815-2, 815-4, 815-5, and 815-6 for core nodes 110-1, 110-2, 110-4, 110-5 and 110-6 and bit vectors included in bit vectors 825-4, 825-5 and 825-6 for SW nodes 120-4, 120-5 and 120-6. Selective bits of these other bit vectors may indicate input ports or output ports using table 700 to determine where values are coming from or where values are to be forwarded as mentioned above for those bit vectors described in more detail. Also, input port registers 330 or collective operation registers 340 for these other core nodes and SW nodes participating in the collective prefix-scan operation may have been configured responsive to receipt of a pscan.{add/mul} instruction via which tree 600 is identified as the collective tree for the collective prefix-scan operation.

According to some examples, implementation of the collective prefix-scan operation may include the prefix-scan operation proceeding through the mapped topology of tree 600 as shown by the various directional arrows depicted in FIG. 8. For these examples, an order of the collective prefix-scan operation mirrors a core node identifier. That is, core node 110-0 is identified in tree 600 as the lowest entry in the collective prefix-scan operation and core node 110-7 is the highest entry in tree 600. Each core node contributes a unique value to be reduced or processed as shown in FIG. 8 by respective letters A-H being inputted to respective core nodes 110-1 to 110-7 represented by the arrows pointing to the left bottom edge of each core node. After contributing unique values, core nodes 110-0 and 110-4 have registers configured to cause these core nodes to broadcast values from their input ports to intra-tile X-axis, intra-tile Y-axis, and intra-tile diagonal output ports. Also, core nodes 110-1 and 110-5 have registers configured to cause these core nodes to broadcast values from their input ports to intra-tile Y-axis and diagonal output ports. Also, core nodes 110-2 and 110-6 have registers configured to cause these core nodes to broadcast values from their input ports to their intra-tile X-axis port. Core node 110-3 has registers configured to cause core node 110-3's CENG to forward results "A+B+C+D" to core node 110-3's intra-tile X-axis output port, the other core nodes in tile 102 do not forward results generated by their CENGs to output ports and instead only return results to their local core node (e.g., to local memory).

As shown in FIG. 8, results "A+B+C+D" are routed to tile 104 via SW node 120-3's inter-tile positive X-axis input port. SW node 120-3 has registers configured to cause results "A+B+C+D" to be forwarded out its inter-tile negative X-axis output port to SW node 120-7 included in tile 106. SW node 120-7 receives "A+B+C+D via its inter-tile positive X-axis input port. SW node 120-7 has registers to cause it to broadcast "A+B+C+D" to its intra-tile SW nodes 120-6, 120-5 and 120-4. SW nodes 120-7, 120-6 have registers configured to cause them to forward "A+B+C+D" to respective core nodes 110-7, 110-6, 110-5 and 110-4 via their inter-tile negative X-axis output ports. As a final step in the collective prefix-scan operation core nodes 110-7, 110-6, 110-5 and 110-4 receive "A+B+C+D" via their inter-tile positive X-axis input ports. Core nodes 110-7, 110-6, 110-5 and 110-4 have registers configured to cause CENGs of these core nodes to only forward generated results based on "A+B+C+D" and other values received from intra-tile core nodes of tile 108 to their respective local core nodes (e.g., local memory). At this point the collective prefix-scan operation is complete. According to tree 600 the collective result may be retrieved by a requestor (e.g., a graph analytics software application) of the collective prefix-scan operation via access to core node 110-7's local memory maintained in a hardware distributed global address space (DGAS).

Figure 9:
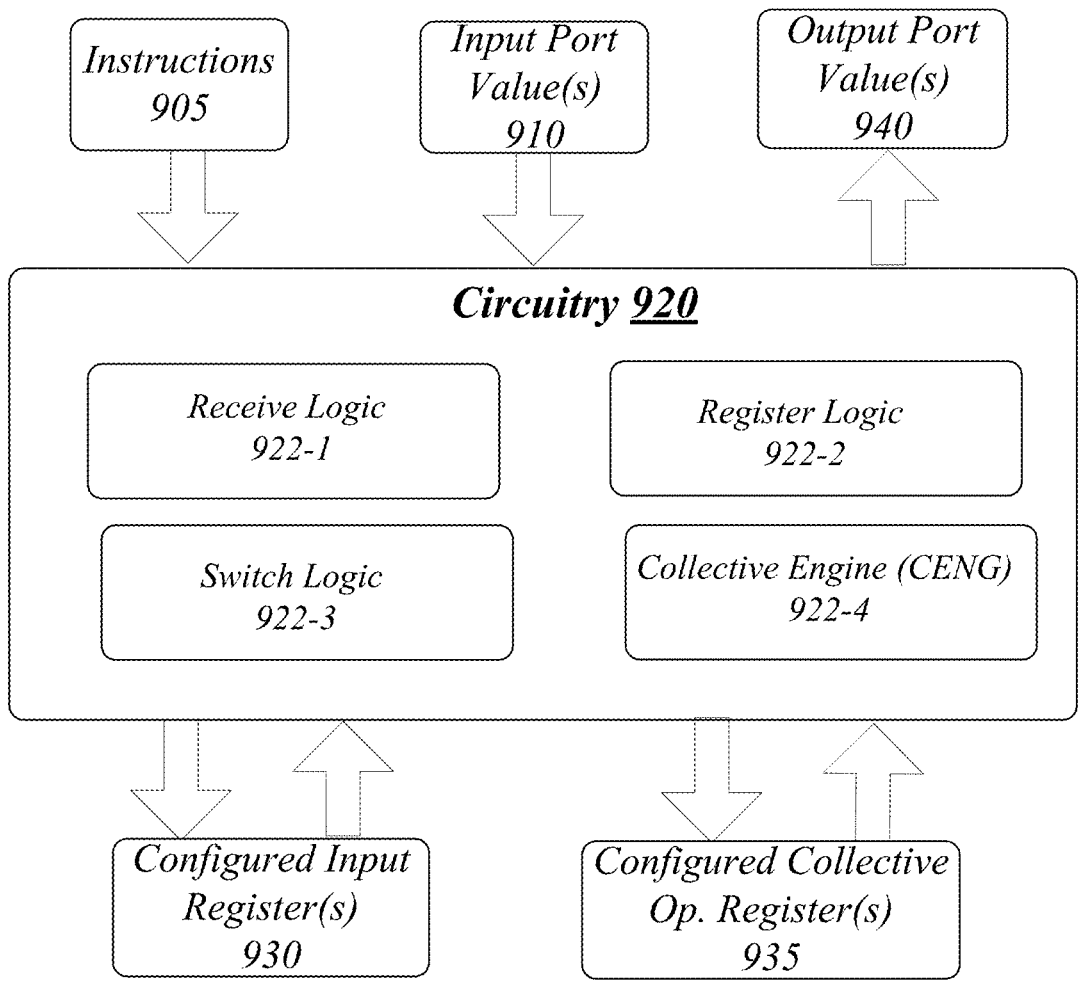
FIG. 9 illustrates an example apparatus.

FIG. 9 illustrates an example apparatus 900. Although apparatus 900 shown in FIG. 9 has a limited number of elements in a certain topology, it may be appreciated that the apparatus 900 may include more or less elements in alternate topologies as desired for a given implementation.

According to some examples, apparatus 900 may be supported by circuitry 920 and apparatus 900 may be a node included among a plurality of nodes resident on a same die or same semiconductor package. For example, core node 110 or SW node 120 such as shown in FIG. 1, 3, 4 or 8. Circuitry 920 may be arranged to execute one or more software or firmware implemented logic, components, or modules 922-*a* (e.g., implemented, at least in part, by a controller of a memory device). It is worthy to note that "a" and "b" and "c" and similar designators as used herein are intended to be variables representing any positive integer. Thus, for example, if an implementation sets a value for a=3, then a complete set of software or firmware for logic, components or modules 922-*a* may include logic 922-1, 922-2 or 922-3. Also, at least a portion of "logic" may be software/firmware stored in computer-readable media, or may be implemented, at least in part in hardware and although the logic is shown in FIG. 9 as discrete boxes, this does not limit logic to storage in distinct computer-readable media components (e.g., a separate memory, etc.) or implementation by distinct hardware components (e.g., separate ASICs or FPGAs).

According to some examples, circuitry 920 may include at least a portion of one or more ASICs or programmable logic (e.g., FPGA) and, in some examples, at least some logic 922-*a* or processing resources (e.g., CENGs) may be implemented as hardware elements of these ASICs or programmable logic.

According to some examples, apparatus 900 may include a receive logic 922-1. Receive logic 922-1 may be a logic and/or feature executed by circuitry 920 to receive an instruction indicating a logical tree to map to a network topology that includes apparatus 900, the instruction associated with a prefix-scan operation. Instructions 905, for example, may include a pscan.{add/mul} instruction via which tree 600 is identified as the tree for the prefix-scan operation.

In some examples, apparatus may also include a register logic 922-2. Register logic 922-2 may be a logic and/or feature executed by circuitry 920 to configure a register of a set of registers maintained at the node based on the logical tree, the register configured to indicate where to forward a value related to the prefix-scan operation. For these examples, the value is to be received via an input port identified in the configured register. For example, configured input register(s) 930 may be configured by register logic 922-2 based on tree 600 to determine where a value included in input port value(s) 910 is to be forwarded.

In some examples, apparatus 900 may also include switch logic 922-3. Switch logic 922-3 may be a logic and/or feature executed by circuitry 920 to forward the value related to the prefix-scan operation based on the register configured by register logic 922-2.

According to some examples, apparatus 900 may function as a switch node. For these examples, switch logic 922-3 forwards the value to an output port of the switch based on a bit vector for configured input registers 930 indicating where to forward the value included in input ports values 910. The forwarded value, for example, included in output port value(s) 940.

In some examples, apparatus 900 may function as a core node and may utilize collective engine (CENG) 922-4 to execute a function using the value included in input port value(s) 910 to generate a result. For these examples, configured register(s) 930 indicate to switch logic 922-3 that the value included in input port value(s) 910 is to be forwarded to CENG 922-4 based on tree 600 indicating that apparatus 900, functioning as a core node, is to utilize CENG 922-4 to execute the function using the value included in input port value(s) 930.

According to some examples where apparatus 900 is functioning as a core node, register logic 922-2 may also configure a second register of the set of registers based on the logical tree to indicate where to forward a second value related to the prefix-scan operation. The second value may be received via a second input port identified in the configured second register. For these examples, the second value may be included in input port value(s) 910 and the configured second register may be included in configured input registers 930, the configured second register may be configured, for example, based on tree 600.

In some examples where apparatus 900 is functioning as a core node, register logic 922-2 may also configure a first register of a second set of registers maintained at apparatus 900 based on the logical tree. The first register may be configured to indicate the input port to receive the value and indicate the second input port to receive the second value. Register logic 922-2 may also configure a second register of the second set of registers based on the logical tree. The second register may be configured to indicate an output port to forward the result generated by CENG 922-4. For these examples, the first and second registers of the second set of registers configured by register logic 922-2 may be included in configured collective operation register(s) 935. CENG 923 may use bit vectors of the first register to determine what other core node the value or the second value came from when included in input port value(s) 910. Switch logic 922-3 may use bit vectors of the second register to determine what outport to forward values generated by CENG 923 following execution of the function using the value and the second value.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 10 illustrates an example of a logic flow 1000. Logic flow 1000 may be representative of some or all of the operations executed by one or more logic, features, or devices described herein, such as logic and/or features included in apparatus 900. More particularly, logic flow 1000 may be implemented by one or more of receive logic 922-1 or register logic 922-2.

According to some examples, as shown in FIG. 10, logic flow 1000 at block 1002 may receive, at a node included among a plurality of nodes resident on a same die or semiconductor package, an instruction indicating a logical tree to map to a network topology that includes the node, the instruction associated with a prefix-scan operation. For these examples, receive logic 922-1 may receive the instruction.

In some examples, logic flow 1000 at block 1004 may configure a register of a set of registers maintained at the node based on the logical tree, the register configured to indicate where to forward a value related to the prefix-scan operation, wherein the value is to be received via an input port identified in the configured register. For these examples, register logic 922-2 may configure the register.

FIG. 11 illustrates an example of a first storage medium. As shown in FIG. 11, the first storage medium includes a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
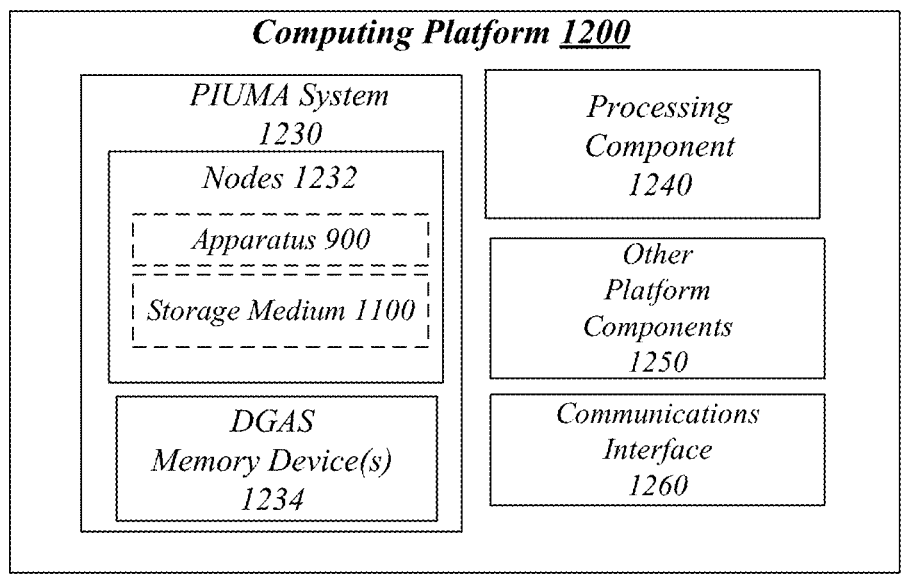
FIG. 12 illustrates an example computing platform.

FIG. 12 illustrates an example computing platform 1200. In some examples, as shown in FIG. 12, computing platform 1200 may include a PIUMA system 1230, a processing component 1240, other platform components 1250 or a communications interface 1260. According to some examples, computing platform 1200 may be implemented in a computing device.

According to some examples, PIUMA system 1230 may be implemented as part of a training engine or training accelerator associated with artificial intelligence applications that may utilize prefix-scan operations to facilitate generation of trained models for the artificial intelligence applications. PIUMA system 1230 may also be implemented as part of an inference engine or inference accelerator associated with implementing at least a portion of the trained models for the artificial intelligence applications. For these examples, PIUMA system 1230 may include nodes 1232 and one or more DGAS memory device(s) 1234 associated with a distributed global address space to be utilized by nodes 1232. For these examples, nodes 1232 may include apparatus 900 and may include storage media such as storage medium 1100. Also, memory device(s) 1234 may include one or more types of volatile or non-volatile memory to support a distributed global address space (DGAS).

According to some examples, processing components 1240 may include various hardware elements, software elements, or a combination of both. Examples of hardware elements may include devices, logic devices, components, processors, microprocessors, management controllers, companion dice, circuits, processor circuits, circuit elements (e.g., transistors, resistors, capacitors, inductors, and so forth), integrated circuits, ASICs, programmable logic devices (PLDs), digital signal processors (DSPs), FPGAs, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

According to some examples, processing component 1240 may include and infrastructure processing unit (IPU)

or data processing unit (DPU) or may be utilized by an IPU or DPU. An xPU may refer at least to an IPU, DPU, graphic processing unit (GPU), general-purpose GPU (GPGPU). An IPU or DPU may include a network interface with one or more programmable or fixed function processors to perform offload of operations that could have been performed by a CPU. The IPU or DPU can include one or more memory devices (not shown). In some examples, the IPU or DPU can perform virtual switch operations, manage storage transactions (e.g., compression, cryptography, virtualization), and manage operations performed on other IPUs, DPUs, servers, or devices.

In some examples, other platform components 1250 may include common computing elements, memory units (that include system memory), chipsets, controllers, peripherals, interfaces, oscillators, timing devices, video cards, audio cards, multimedia input/output (I/O) components (e.g., digital displays), power supplies, and so forth. Examples of memory units or memory devices included in other platform components 1250 may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1260 may include logic and/or features to support a communication interface. For these examples, communications interface 1260 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification or the I3C specification. Network communications may occur via use of communication protocols or standards such those described in one or more Ethernet standards promulgated by the Institute of Electrical and Electronics Engineers (IEEE). For example, one such Ethernet standard promulgated by IEEE may include, but is not limited to, IEEE 802.3-2018, Carrier sense Multiple access with Collision Detection (CSMA/CD) Access Method and Physical Layer Specifications, Published in August 2018 (hereinafter "IEEE 802.3 specification"). Network communication may also occur according to one or more OpenFlow specifications such as the OpenFlow Hardware Abstraction API Specification. Network communications may also occur according to one or more Infiniband Architecture specifications.

Computing platform 1200 may be part of a computing device that may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1200 described herein, may be included or omitted in various embodiments of computing platform 1200, as suitably desired.

The components and features of computing platform 1200 may be implemented using any combination of discrete circuitry, ASICs, logic gates and/or single chip architectures. Further, the features of computing platform 1200 may be implemented using microcontrollers, programmable logic arrays and/or microprocessors or any combination of the foregoing where suitably appropriate. It is noted that hardware, firmware and/or software elements may be collectively or individually referred to herein as "logic", "circuit" or "circuitry."

It should be appreciated that the exemplary computing platform 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Although not depicted, any system can include and use a power supply such as but not limited to a battery, AC-DC converter at least to receive alternating current and supply direct current, renewable energy source (e.g., solar power or motion based power), or the like.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to additional examples of technologies disclosed herein.

Example 1. An example apparatus may include circuitry of a node included among a plurality of nodes resident on a same semiconductor package. The circuitry may receive an instruction indicating a logical tree to map to a network topology that includes the node, the instruction associated with a prefix-scan operation. The circuitry may also configure a register of a set of registers maintained at the node based on the logical tree. The register may be configured to indicate where to forward a value related to the prefix-scan operation, wherein the value is to be received via an input port identified in the configured register.

Example 2. The apparatus of example 1, the node may be a core node, at least a portion of the circuitry to be configured to execute a function using the value to be received via the input port to generate a result. For this example, the configured register indicates that the value is to be forwarded to the at least a portion of the circuitry based on the logical tree indicating the core node is to execute the function using the value.

Example 3. The apparatus of example 2, the circuitry may also configure a second register of the set of registers based on the logical tree to indicate where to forward a second value related to the prefix-scan operation. For this example, the second value is to be received via a second input port identified in the configured second register.

Example 4. The apparatus of example 3, the circuitry may also configure a first register of a second set of registers maintained at the node based on the logical tree. The first register may be configured to indicate the input port to receive the value and indicate the second input port to receive the second value. The circuitry may also configure a second register of the second set of registers based on the logical tree, the second register to be configured to indicate an output port to forward the result generated by the at least a portion of the circuitry.

Example 5. The apparatus of example 4, the output port to forward the result generated by the at least a portion of the circuitry may be to a local memory for the core node that is included in a distributed global address space.

Example 6. The apparatus of example 1, the node may be a switch node, the configured register to indicate to forward the value to an output port of the switch node.

Example 7. The apparatus of example 6, to forward the value to the output port may include causing the value to be sent to a core node included in the plurality of nodes resident on the same semiconductor package.

Example 8. The apparatus of example 6, to forward the value to the output port may include causing the value to be sent to a second switch node included in the plurality of nodes resident on the same semiconductor package. For this example, the input port at the switch node may be coupled with a first core node of a first grouping of core nodes included in the plurality of nodes resident on the same semiconductor package. The second switch node may be coupled to a second core node of a second grouping of core nodes included in the plurality of nodes resident on the same semiconductor package. The second switch node may cause the value to be forwarded to the second core node.

Example 9. The apparatus of example 1, the circuitry may also configure a second register of the set of registers based on the logical tree to indicate where to forward a second value related to the prefix-scan operation. For this example, the second value may be received via a second input port identified in the configured second register. The circuitry may also configure a third register of the set of registers based on the logical tree to indicate where to forward a third value related to the prefix-scan operation. Also, for this example, the third value may be received via a third input port identified in the configured third register. The circuitry may also configure a fourth register of the set of registers based on the logical tree to indicate where to forward a fourth value related to the prefix-scan operation. The fourth value may be received via a fourth input port identified in the configured fourth register.

Example 10. The apparatus of example 9, the node may be a core node, at least a portion of the circuitry to be configured to execute a function using the value, the second value, the third value and the fourth value to be received via respective first, second, third and fourth input ports to generate a result. For this example, the configured register may indicate that the value, the second value, the third value and the fourth value are to be forwarded to the at least a portion of the circuitry based on the logical tree indicating the core node is to execute the function using the value, the second value, the third value and the fourth value.

Example 11. The apparatus of example 10, the circuitry may also configure a first register of a second set of registers maintained at the core node based on the logical tree. The first register may be configured to indicate the input port to receive the value, the second input port to receive the second value, the third input port to receive the third value and the fourth input port to receive the fourth value. The circuitry may also configure a second register of the second set of registers based on the logical tree. The second register may be configured to indicate a first output port and a second output port to forward the result generated by the at least a portion of the circuitry.

Example 12. The apparatus of example 11, the first output port to forward the result generated by the at least a portion of the circuitry may be to a local memory for the core node that is included in a distributed global address space. The second output port to forward the result generated by the at least a portion of the circuitry may be to a switch node included in the plurality of nodes resident on the same semiconductor package.

Example 13. An example method may include receiving, at a node included among a plurality of nodes resident on a same semiconductor package, an instruction indicating a logical tree to map to a network topology that includes the node, the instruction associated with a prefix-scan operation. The method may also include configuring a register of a set of registers maintained at the node based on the logical tree, the register configured to indicate where to forward a value related to the prefix-scan operation, wherein the value is to be received via an input port identified in the configured register.

Example 14. The method of example 13, the node may be a core node having circuitry configured to execute a function using the value to be received via the input port to generate a result. For this example, the configured register may indicate that the value is to be forwarded to the circuitry based on the logical tree indicating the core node is to execute the function using the value.

Example 15. The method of example 14 may also include configuring a second register of the set of registers based on the logical tree to indicate where to forward a second value related to the prefix-scan operation. For this example, the second value may be received via a second input port identified in the configured second register.

Example 16. The method of example 15 may also include configuring a first register of a second set of registers maintained at the node based on the logical tree. The first register may be configured to indicate the input port to receive the value and indicate the second input port to receive the second value. The method may also include configuring a second register of the second set of registers based on the logical tree, the second register to be configured to indicate an output port to forward the result generated by the at least a portion of the circuitry.

Example 17. The method of example 16, the output port to forward the result generated by the core node's circuitry may be to a local memory for the core node that is included in a distributed global address space.

Example 18. The method of example 13, the node may be a switch node, the configured register to indicate to forward the value to an output port of the switch node.

Example 19. The method of example 18, the value to the output port may include causing the value to be sent to a core node included in the plurality of nodes resident on the same semiconductor package.

Example 20. The method of example 18, forwarding the value to the output port may include causing the value to be sent to a second switch node included in the plurality of nodes resident on the same semiconductor package. For this example, the input port at the switch node is coupled with a first core node of a first grouping of core nodes included in the plurality of nodes resident on the same semiconductor package and the second switch node is coupled to a second core node of a second grouping of core nodes included in the plurality of nodes resident on the same semiconductor package, the second switch node to cause the value to be forwarded to the second core node.

Example 21. The method of example 13 may also include configuring a second register of the set of registers based on the logical tree to indicate where to forward a second value related to the prefix-scan operation. The second value may be received via a second input port identified in the configured second register. The method may also include configuring a third register of the set of registers based on the logical tree to indicate where to forward a third value related to the prefix-scan operation. The third value may be received via a third input port identified in the configured third register. The method may also include configuring a fourth register of the set of registers based on the logical tree to indicate where to forward a fourth value related to the prefix-scan operation. The fourth value may be received via a fourth input port identified in the configured fourth register.

Example 22. The method of example 21, the node may be a core node having circuitry to execute a function using the value. The second value, the third value and the fourth value may be received via respective first, second, third and fourth input ports to generate a result. For this example, the configured register may indicate that the value, the second value, the third value and the fourth value are to be forwarded to the core node's circuitry based on the logical tree indicating the core node is to execute the function using the value, the second value, the third value and the fourth value.

Example 23. The method of example 22 may also include configuring a first register of a second set of registers maintained at the core node based on the logical tree. The first register may be configured to indicate the input port to receive the value, the second input port to receive the second value, the third input port to receive the third value and the fourth input port to receive the fourth value. The method may also include configuring a second register of the second set of registers based on the logical tree. The second register may be configured to indicate a first output port and a second output port to forward the result generated by the core node's circuitry.

Example 24. The method of example 23 may also include the first output port to forward the result generated by the at least a portion of the circuitry may be to a local memory for the core node that is included in a distributed global address space. The method may also include the second output port to forward the result generated by the at least a portion of the circuitry may be to a switch node included in the plurality of nodes resident on the same semiconductor package.

Example 25. An example at least one machine readable medium may include a plurality of instructions that in response to being executed by a system may cause the system to carry out a method according to any one of examples 13 to 24.

Example 26. An example apparatus may include means for performing the methods of any one of examples 13 to 24.

Example 27. An example system may include a first grouping of interconnected core nodes to couple with a first grouping of interconnected switch nodes on a semiconductor package. The system may also include a second grouping of interconnected core nodes to couple with a second grouping of interconnected switch nodes on the semiconductor package. For this example system, each core node included in the first or second grouping of interconnected core nodes or each switch node included in the first or second grouping of interconnected switch nodes separately includes circuitry. The circuitry may receive an instruction indicating a logical tree to map to a network topology that includes the first and second grouping of interconnected core nodes and first and second grouping of interconnected switch nodes. The instruction may be associated with a prefix-scan operation. The circuitry may also configure a register of a set of registers based on the logical tree. The register may be configured to indicate where to forward a value related to the prefix-scan operation. The value may be received via an input port identified in the configured register.

Example 28. The system of example 27, circuitry of a first core node included in the first grouping of interconnect core nodes may be configured to execute a function using the value to be received via the input port to generate a result. For this example, the configured register indicates that the value is to be forwarded to the at least a portion of the circuitry based on the logical tree indicating the first core node is to execute the function using the value.

Example 29. The system of example 28, the circuitry of the first core node may configure a second register of the set of registers based on the logical tree to indicate where to forward a second value related to the prefix-scan operation. The second value may be received via a second input port identified in the configured second register.

Example 30. The system of example 29, may further include the circuitry of the first core node to configure a first register of a second set of registers maintained at the first core node based on the logical tree. The first register may be configured to indicate the input port to receive the value and indicate the second input port to receive the second value. The circuitry of the first core node may also configure a second register of the second set of registers based on the logical tree, the second register to be configured to indicate an output port to forward the result generated by the at least a portion of the circuitry.

Example 31. The system of example 30, the output port to forward the result generated by the at least a portion of the circuitry may be to a local memory for the first core node that is included in a distributed global address space.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    circuitry of a node included among a plurality of nodes resident on a same semiconductor package, the circuitry to:
        receive an instruction indicating a logical tree to map to a network topology that includes the node, the instruction associated with a prefix-scan operation; and
        configure a register of a set of registers maintained at the node based on the logical tree, the register to be configured to indicate where to forward a value related to the prefix-scan operation, wherein the value is to be received via an input port identified in the configured register;
    wherein:
        the node comprises a core node, and at least a portion of the circuitry is to be configured to execute a function using the value to be received via the input port to generate a result.

2. The apparatus of claim 1, wherein the configured register indicates that the value is to be forwarded to the at least a portion of the circuitry based on the logical tree indicating the core node is to execute the function using the value.

3. The apparatus of claim 2, comprising the circuitry to:
    configure a second register of the set of registers based on the logical tree to indicate where to forward a second value related to the prefix-scan operation, wherein the second value is to be received via a second input port identified in the configured second register.

4. The apparatus of claim 3, comprising the circuitry to:
    configure a first register of a second set of registers maintained at the node based on the logical tree, the first register to be configured to indicate the input port to receive the value and indicate the second input port to receive the second value; and
    configure a second register of the second set of registers based on the logical tree, the second register to be configured to indicate an output port to forward the result generated by the at least a portion of the circuitry.

5. The apparatus of claim 4, comprising the output port to forward the result generated by the at least a portion of the circuitry is to a local memory for the core node that is included in a distributed global address space.

6. The apparatus of claim 1, the node comprising a switch node, the configured register to indicate to forward the value to an output port of the switch node.

7. The apparatus of claim 6, comprising to forward the value to the output port is to cause the value to be sent to the core node.

8. The apparatus of claim 6, comprising to forward the value to the output port is to cause the value to be sent to a second switch node included in the plurality of nodes resident on the same semiconductor package, wherein the input port at the switch node is coupled with a first core node of a first grouping of core nodes included in the plurality of nodes resident on the same semiconductor package and the second switch node is coupled to a second core node of a second grouping of core nodes included in the plurality of nodes resident on the same semiconductor package, the second switch node to cause the value to be forwarded to the second core node.

9. The apparatus of claim 1, comprising the circuitry to:
configure a second register of the set of registers based on the logical tree to indicate where to forward a second value related to the prefix-scan operation, wherein the second value is to be received via a second input port identified in the configured second register;
configure a third register of the set of registers based on the logical tree to indicate where to forward a third value related to the prefix-scan operation, wherein the third value is to be received via a third input port identified in the configured third register; and
configure a fourth register of the set of registers based on the logical tree to indicate where to forward a fourth value related to the prefix-scan operation, wherein the fourth value is to be received via a fourth input port identified in the configured fourth register.

10. The apparatus of claim 9, the second value, the third value and the fourth value to be received via respective first, second, third and fourth input ports for use in generating the result, wherein the configured register indicates that the value, the second value, the third value and the fourth value are to be forwarded to the at least a portion of the circuitry based on the logical tree indicating the core node is to execute the function using the value, the second value, the third value and the fourth value.

11. The apparatus of claim 10, comprising the circuitry to:
configure a first register of a second set of registers maintained at the core node based on the logical tree, the first register to be configured to indicate the input port to receive the value, the second input port to receive the second value, the third input port to receive the third value and the fourth input port to receive the fourth value; and
configure a second register of the second set of registers based on the logical tree, the second register to be configured to indicate a first output port and a second output port to forward the result generated by the at least a portion of the circuitry.

12. The apparatus of claim 11, comprising:
the first output port to forward the result generated by the at least a portion of the circuitry is to a local memory for the core node that is included in a distributed global address space; and
the second output port to forward the result generated by the at least a portion of the circuitry is to a switch node included in the plurality of nodes resident on the same semiconductor package.

13. A method comprising:
receiving, at a node included among a plurality of nodes resident on a same semiconductor package, an instruction indicating a logical tree to map to a network topology that includes the node, the instruction associated with a prefix-scan operation; and
configuring a register of a set of registers maintained at the node based on the logical tree, the register configured to indicate where to forward a value related to the prefix-scan operation, wherein the value is to be received via an input port identified in the configured register;

wherein:
the node comprises a core node having circuitry configured to execute a function using the value to be received via the input port to generate a result.

14. The method of claim 13, wherein the configured register indicates that the value is to be forwarded to the circuitry based on the logical tree indicating the core node is to execute the function using the value.

15. The method of claim 13, the node comprising a switch node, the configured register to indicate to forward the value to an output port of the switch node.

16. The method of claim 15, forwarding the value to the output port comprises causing the value to be sent to a second switch node included in the plurality of nodes resident on the same semiconductor package, wherein the input port at the switch node is coupled with a first core node of a first grouping of core nodes included in the plurality of nodes resident on the same semiconductor package and the second switch node is coupled to a second core node of a second grouping of core nodes included in the plurality of nodes resident on the same semiconductor package, the second switch node to cause the value to be forwarded to the second core node.

17. The method of claim 13, further comprising:
configuring a second register of the set of registers based on the logical tree to indicate where to forward a second value related to the prefix-scan operation, wherein the second value is to be received via a second input port identified in the configured second register;
configuring a third register of the set of registers based on the logical tree to indicate where to forward a third value related to the prefix-scan operation, wherein the third value is to be received via a third input port identified in the configured third register; and
configuring a fourth register of the set of registers based on the logical tree to indicate where to forward a fourth value related to the prefix-scan operation, wherein the fourth value is to be received via a fourth input port identified in the configured fourth register.

18. The method of claim 17, the second value, the third value and the fourth value to be received via respective first, second, third and fourth input ports for use in generating the result, wherein the configured register indicates that the value, the second value, the third value and the fourth value are to be forwarded to the core node's circuitry based on the logical tree indicating the core node is to execute the function using the value, the second value, the third value and the fourth value.

19. The method of claim 18, further comprising:
configuring a first register of a second set of registers maintained at the core node based on the logical tree, the first register to be configured to indicate the input port to receive the value, the second input port to receive the second value, the third input port to receive the third value and the fourth input port to receive the fourth value; and
configuring a second register of the second set of registers based on the logical tree, the second register to be configured to indicate a first output port and a second output port to forward the result generated by the core node's circuitry.

20. The method of claim 19, further comprising:
the first output port to forward the result generated by the at least a portion of the circuitry is to a local memory for the core node that is included in a distributed global address space; and the second output port to forward the result generated by the at least a portion of the circuitry is to a switch node included in the plurality of nodes resident on the same semiconductor package.

21. A system comprising:
a first grouping of interconnected core nodes to couple with a first grouping of interconnected switch nodes on a semiconductor package; and
a second grouping of interconnected core nodes to couple with a second grouping of interconnected switch nodes on the semiconductor package,
wherein:
each core node included in the first or second grouping of interconnected core nodes or each switch node included in the first or second grouping of interconnected switch nodes separately includes circuitry to:
receive an instruction indicating a logical tree to map to a network topology that includes the first and second grouping of interconnected core nodes and first and second grouping of interconnected switch nodes, the instruction associated with a prefix-scan operation;
configure a register of a set of registers based on the logical tree, the register to be configured to indicate where to forward a value related to the prefix-scan operation, wherein the value is to be received via an input port identified in the configured register; and
circuitry of a first core node included in the first grouping of interconnect core nodes is to be configured to execute a function using the value to be received via the input port to generate a result.

22. The system of claim 21, wherein the configured register indicates that the value is to be forwarded to the at least a portion of the circuitry based on the logical tree indicating the first core node is to execute the function using the value.

23. The system of claim 21, further comprising the circuitry of the first core node to:
configure a second register of the set of registers based on the logical tree to indicate where to forward a second value related to the prefix-scan operation, wherein the second value is to be received via a second input port identified in the configured second register.

24. The system of claim 23, further comprising the circuitry of the first core node to:
configure a first register of a second set of registers maintained at the first core node based on the logical tree, the first register to be configured to indicate the input port to receive the value and indicate the second input port to receive the second value; and
configure a second register of the second set of registers based on the logical tree, the second register to be configured to indicate an output port to forward the result generated by the at least a portion of the circuitry.

25. The system of claim 24, comprising the output port to forward the result generated by the at least a portion of the circuitry is to a local memory for the first core node that is included in a distributed global address space.

* * * * *